(12) United States Patent
Schindler et al.

(10) Patent No.: US 8,985,294 B2
(45) Date of Patent: Mar. 24, 2015

(54) HYDRAULIC CONTROL ARRANGEMENT FOR AN AUTOMATIC TRANSMISSION

(71) Applicants: Joerg Schindler, Bietigheim-Bissingen (DE); Michael Baraga, Stuttgart (DE); Markus Brandenburg, Esslingen (DE); Henrik Kalczynski, Stuttgart (DE); Thomas Kull, Waiblingen (DE)

(72) Inventors: Joerg Schindler, Bietigheim-Bissingen (DE); Michael Baraga, Stuttgart (DE); Markus Brandenburg, Esslingen (DE); Henrik Kalczynski, Stuttgart (DE); Thomas Kull, Waiblingen (DE)

(73) Assignee: Daimler AG, Stuttgart (DE)

( * ) Notice: Subject to any disclaimer, the term of this patent is extended or adjusted under 35 U.S.C. 154(b) by 169 days.

(21) Appl. No.: 13/757,806

(22) Filed: Feb. 3, 2013

(65) Prior Publication Data
US 2013/0319806 A1 Dec. 5, 2013

Related U.S. Application Data

(63) Continuation-in-part of application No. PCT/EP2011/003904, filed on Aug. 4, 2011.

(30) Foreign Application Priority Data

Aug. 25, 2010 (DE) .......................... 10 2010 035 505

(51) Int. Cl.
*F16H 63/34* (2006.01)
*B60T 1/00* (2006.01)
*F16H 61/02* (2006.01)
*F16H 61/686* (2006.01)

(52) U.S. Cl.
CPC ............ *B60T 1/005* (2013.01); *F16H 63/3483* (2013.01); *F16H 61/0206* (2013.01); *F16H 61/686* (2013.01); *F16H 2061/0209* (2013.01)
USPC ........................................ 192/219.4; 192/221

(58) Field of Classification Search
CPC ........................... F16H 63/3483; F16H 63/483
USPC ............................................ 192/219.4, 219.5
See application file for complete search history.

(56) References Cited

U.S. PATENT DOCUMENTS

| | | | | |
|---|---|---|---|---|
| 3,610,004 | A | * | 10/1971 | Neese .............................. 70/218 |
| 5,409,434 | A | * | 4/1995 | Furukawa et al. ............. 477/131 |
| 5,415,076 | A | | 5/1995 | Krone et al. |
| 6,196,247 | B1 | | 3/2001 | Knoell et al. |
| 6,698,555 | B2 | * | 3/2004 | Schafer et al. ................ 188/170 |
| 2003/0019702 | A1 | * | 1/2003 | Goedecke et al. ............ 188/353 |
| 2007/0056399 | A1 | | 3/2007 | Barnes et al. |

FOREIGN PATENT DOCUMENTS

| | | |
|---|---|---|
| DE | 101 36 425 | 2/2003 |
| DE | 10 2008 055 626 | 5/2010 |

* cited by examiner

*Primary Examiner* — Richard Lorence
(74) *Attorney, Agent, or Firm* — Klaus J. Bach

(57) ABSTRACT

In a hydraulic control arrangement for an automatic transmission of a motor vehicle having a parking lock activation system wherein operating fluid is supplied via a parking lock slide valve to a first parking lock pressure chamber for moving a parking lock-up piston in one direction into a locking position or moving the parking lock piston in an opposite direction, whereby operating fluid is released from the first parking lock pressure chamber via a discharge slide valve by way of which the first parking brake pressure chamber is connected to a tank for releasing the parking lock-up.

10 Claims, 1 Drawing Sheet

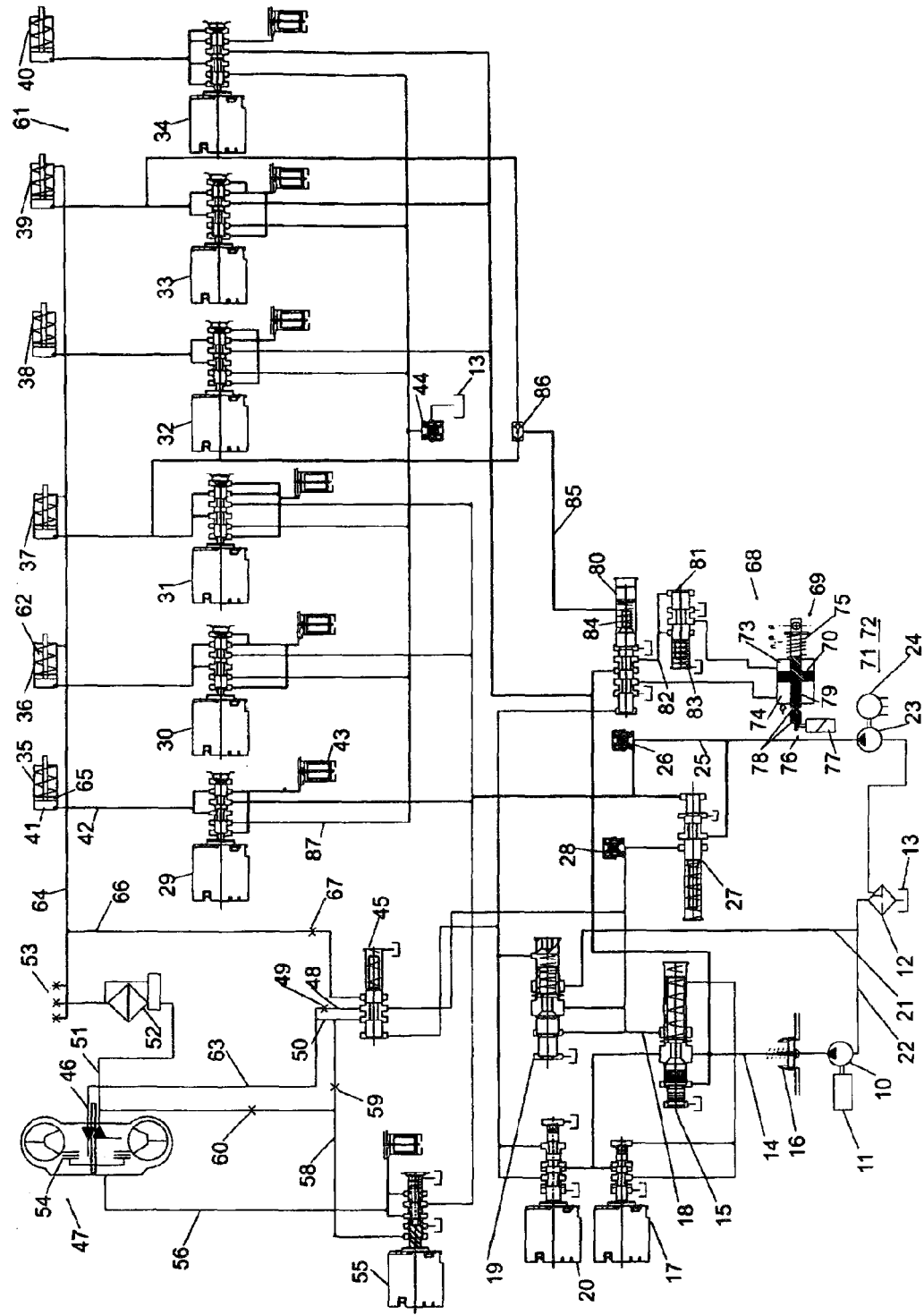

HYDRAULIC CONTROL ARRANGEMENT FOR AN AUTOMATIC TRANSMISSION

This is a Continuation-In-Part application of pending international patent application PCT/EP2011/003904 filed Aug. 4, 2011 and claiming the priority of German patent application 10 2010 035 505.4 filed Aug. 25, 2010.

BACKGROUND OF THE INVENTION

The invention relates to a hydraulic control arrangement for an automatic transmission of a motor vehicle with a parking lock activation system.

DE 101 36 425 A1 describes a hydraulic control arrangement with a parking lock activation system for an automatic transmission of a motor vehicle. The lock activation system has a locking slide valve in the form of a switching valve and a locking piston-cylinder unit with a locking piston. By supplying operating fluid via the locking slide valve to a first locking pressure chamber, the locking piston can be displaced in a first activation direction. When the locking piston is displaced in a second activation direction contrary to the first activation direction, operating fluid is removed from the first locking pressure chamber. The operating fluid removed from the first pressure chamber upon displacement of the locking piston in the second activation direction flows via the switching valve to a tank. In order to displace the locking piston in the second activation direction, operating fluid is conducted via the locking slide valve into a second locking pressure chamber, the first pressure chamber being separated from the second pressure chamber by the locking piston.

It is the principal object of the present invention to provide a hydraulic control unit for an automatic transmission, by means of which a parking lockup can be quickly and securely activated.

SUMMARY OF THE INVENTION

In a hydraulic control arrangement for an automatic transmission of a motor vehicle having a parking lock activation system wherein operating fluid is supplied via a parking lock slide valve to a first parking lock pressure chamber for moving a parking lock-up piston in one direction into a locking position or discharged from the parking lock pressure chamber for moving the parking lock piston in an opposite direction, whereby operating fluid is released from the first parking lock pressure chamber via a discharge slide valve by way of which the first parking brake pressure chamber is connected to a tank for releasing the parking lock-up.

According to the invention the parking lock activation system comprises a discharge slide valve, by means of which the first parking lock pressure chamber can be connected to a tank. Upon displacement of the parking lock piston in the second activating direction, in which operating fluid must be removed from the first parking lock pressure chamber, the operating fluid can flow via the discharge slide valve directly into the tank without having to flow through the parking lock slide valve. The discharge slide valve is configured in particular so that it has a low flow resistance at least in a discharge position and the operating fluid can thus flow easily and quickly in the direction of the tank. The parking lock slide valve usually has a greater flow resistance as it is designed for secure and exact control of the parking lock, which makes low maximum through-flow cross-sections necessary.

Operating fluid discharge via the discharge slide valve is important particularly when an activating force in the second activating direction is not sufficient or a sufficiently high activation force cannot be applied. This is the case particularly when the available system pressure or working pressure of the hydraulic control unit is very low, which occurs for example when a drive unit, in particular an internal combustion engine, which drives a pump of the hydraulic control unit, is being or has already been shut down.

In order to engage the parking lock for securing the motor vehicle against undesired rolling-away, the parking lock piston is displaced in particular in the second activation direction. For example, a so-called parking lock pawl is at least indirectly connected to the locking piston, said parking lock pawl being brought into a positive locking engagement with a so-called parking lock wheel which is rotationally securely connected to a transmission output shaft. The hydraulic control unit according to the invention thus facilitates in particular a secure and rapid engagement of the parking lock.

A "tank" is to be understood in particular as a chamber, in particular within the automatic transmission, in which excess operating fluid collects and from which a pump of the hydraulic control unit can draw operating fluid. It is not thereby necessary for the discharge slide valve to connect the first parking lock pressure chamber directly to the tank. It is completely adequate if a connection to a so-called tank outlet is provided, via which operating fluid can flow without notable flow resistance into the tank.

The automatic transmission is designed for example as a transmission with a plurality of coupled planetary gears. It is designed in particular as an automatic transmission corresponding to DE 2008 055 626 A1 assigned to the assignee of the present application. The automatic transmission can, however, also be for example an automated gear change transmission, a double clutch transmission or a stepless transmission.

According to one embodiment of the invention the parking lock slide valve is designed so that in its basic position there is no connection by means thereof between a parking lock connecting line and the tank. Via the parking lock connecting line, operating fluid can be fed via the parking lock slide valve to the first parking lock pressure chamber or also removed therefrom. A basic position is thereby to be understood as the position adopted by the parking lock slide valve without the application of a control pressure. The parking lock slide valve thus adopts the basic position also in particular when the internal combustion engine is shut down. In the basic position of the parking lock slide valve, there is no desired connection between the parking lock connecting line and the tank. In this position, operating fluid could only pass via narrow gaps, so-called slide valve gaps, from the parking lock connecting line to the tank. If the parking lock piston is to be moved in the second activating direction and the parking lock slide valve can no longer be brought out of its basic position, due to the system or working pressure being too low, thus in particular when the internal combustion engine is at a standstill, the operating fluid which must be removed from the first parking lock pressure chamber would have to flow out via said slide valve gaps of the parking lock slide valve to the tank. The movement of the parking locking piston in the second activating direction, which is necessary in particular for engaging the parking lock, would thus take a relatively long time and the vehicle could not be quickly secured against rolling away. The provision according to the invention of the discharge slide valve facilitates a very rapid removal of operating fluid from the first parking lock pressure chamber also when of an internal combustion engine is shut down and thus in particular a very rapid engagement of the parking lock.

According to one embodiment of the invention the discharge slide valve is arranged between the parking lock slide valve and the parking lock piston-cylinder unit and has at least two positions. In a fill position, a parking lock connecting line between the parking lock slide valve and the discharge slide valve is connected via the discharge slide valve to the first parking lock pressure chamber. In a discharge position, the first parking lock pressure chamber is connected via the discharge slide valve to the tank and the parking lock connecting line is closed by the discharge slide valve. "Closed" is intended to mean in particular that through the discharge slide valve, an outflow of operating fluid from the parking lock connecting line is prevented so that a pressure can build up in the parking lock connecting line. By way of control pressure for switching between the aforementioned positions of the discharge slide valve, a pressure in the parking lock connecting line between the parking lock slide valve and the discharge slide valve is conveyed to the discharge slide valve. In order to move the parking lock slide valve in the first activating direction; thus in particular in order to disengage the parking lock, operating fluid must be supplied under pressure via the parking lock slide valve and the parking lock connecting line to the first parking lock pressure chamber. This pressure acts as control pressure on the discharge slide valve so that no separate control pressure must be produced or removed. The structure of the hydraulic control unit is thus particularly simple.

The discharge slide valve has in particular only the fill position and the discharge position. The control pressure then acts against a discharge spring, wherein the discharge slide valve can be brought by the discharge spring into the discharge position. When no control pressure is applied at the discharge slide valve, it is in the discharge position. If the parking lock slide valve is moved in the first activating direction, operating fluid is supplied to the first parking lock pressure chamber, operating fluid is fed via the parking lock slide valve into the parking lock connecting line so that a pressure builds up in the parking lock connecting line which acts as control pressure on the discharge slide valve and moves it into the fill position. The construction of the hydraulic control unit is thus particularly simple, as the parking lock connecting line can be used in a dual manner. On the one hand it is connected to the discharge slide valve in order that operating fluid can thereby be conveyed into the first parking lock pressure chamber and on the other hand the control pressure for the discharge slide is thereby taken. The required construction space for the discharge slide valve is thus very low. In addition it is ensured by this arrangement of the discharge valve that in cases in which no system pressure is available in the hydraulic control unit, the discharge slide valve is brought by the discharge spring into the discharge position and thus facilitates a rapid activation of the parking lock slide valve in the second activating direction, thus in particular in order to engage the parking lock.

According to one embodiment of the invention the parking lock piston-cylinder unit comprises a parking lock spring which is arranged so that it applies a force to the parking lock piston in the second activating direction. The parking lock spring is thereby designed in particular so that in cases in which the first parking lock pressure chamber is connected to the tank via the discharge slide valve, said parking lock spring can displace the parking lock piston in the second activating direction, thus in particular for engaging the parking lock. It can thereby be guaranteed that an activation of the parking lock, in particular an engagement of the parking lock, is also possible in case of very low system pressure of the hydraulic control unit. In particular the engagement of the parking lock is also possible when the drive unit is shut down.

According to an embodiment of the invention the parking lock piston-cylinder unit comprises a second parking lock pressure chamber, into which operating fluid can be supplied via the parking lock slide valve in order to displace the parking lock piston in the second activating direction, thus in particular to engage the parking lock. In case of a corresponding position of the parking lock slide valve in the second parking lock pressure chamber, a pressure can be built up so that an activating force acts on the parking lock piston in the second activating direction, thus in particular for engagement of the parking lock. Through the corresponding adjustment of the parking lock slide valve, therefore, an activating force which acts alone or in addition to the parking lock spring can be applied in the second activating direction. A secure and robust activation of the parking lock is thus possible.

The parking lock slide valve is designed in particular so that by means thereof operating fluid can be supplied either to the first or second parking lock pressure chamber and the other respective parking lock pressure chamber, or in case of the first parking lock pressure chamber, said parking lock connecting line is connected to the tank.

According to one embodiment of the invention the parking lock piston-cylinder unit comprises a controllable engagement means, by means of which a position of the parking lock piston can be fixed. The engagement means comprises for example a lifting magnet which can engage in a corresponding contour of a piston rod of the parking lock piston-cylinder unit. The engagement means can also comprise a hydraulically or pneumatically activated locking element which can engage in said contour. The engagement means is designed in particular so that it can be "over-pressured" in one activating direction and cannot be over-pressured in the other activating direction. This can be achieved for example through a suitable design of said contour and the lifting magnet. "Over-pressured" is thereby to be understood in particular to mean that the parking lock piston can be displaced in spite of the engagement means being activated. The engagement means is in particular designed in such a way that it can be over-pressured in the second activating direction, thus for engagement of the parking lock. In this connection said contour comprises for example an inclination, via which the lifting magnet or the locking element can be pressed back. The engagement means is thereby designed so that it can be over-pressured through the combination of the activating forces due to the pressure in the second parking lock pressure chamber and the parking lock spring. Through a corresponding pressure in the second parking lock pressure chamber, therefore, the parking lock can also be engaged when the lifting magnet or the locking element can no longer be controlled. In the first activating direction, thus for disengagement of the parking lock, no over-pressure of the engagement means is possible. With this design of the engagement means, even in case of a failure of the lifting magnet or the locking element, the parking lock can be engaged but no longer disengaged. The motor vehicle can thereby be secured against rolling away or undesired towing away.

According to an embodiment of the invention the hydraulic control unit comprises a pre-control valve and a first and a second valve unit. A pre-control pressure set by means of the pre-control valve can be conveyed as control pressure to the first and second valve unit and to the parking lock slide valve as a third valve unit. By means of a counter-pressure line, a counter-pressure acting on the parking lock piston against the control pressure can be applied to the parking lock slide valve and an activation of the parking lock slide valve can thus also be prevented even in case of a high control pressure. It is thus advantageously possible to control three valve units with only one pre-control valve. At the same time by applying the counter-pressure to the parking lock slide valve, the activation of the parking lock slide valve can be prevented so that the first or in particular the second valve unit can be activated without simultaneously activating the parking lock slide valve. This facilitates a large number of different control possibilities of the individual valve units with only one pre-control valve and thus a great scope of functions of the hydraulic control unit with few hydraulic components.

The pre-control valve is designed for example as a regulating magnetic valve, in particular as a so-called direct control valve. The pre-control valve is supplied with a supply pressure for example in the form of a working pressure or a valve supply pressure and takes therefrom, corresponding to the control by an electronic transmission control, a desired pre-control pressure.

The parking lock slide valve is designed in particular as a switching slide valve, on the slide valve of which on one side the pre-control pressure can act as a control pressure and on an opposing side of the slide valve the counter pressure can act. In addition the parking lock slide valve comprises in particular a spring which can apply a force acting contrary to the pre-control pressure to the slide valve. Through a corresponding design of the operationally effective surfaces on the slide valve, the pressure ranges of the pre-control and the counter-pressure and possibly the spring, it can be ensured that by applying a counter-pressure to the parking lock slide valve an activation of the parking lock slide valve can be prevented. An activation of the parking lock slide valve is thus understood to be a change in the switching position of the switching valve.

According to a particular embodiment of the invention, a first, second and third pressure range are provided for activating the first and second valve unit and the parking lock slide valve. A switching valve is thereby to be understood in that through changes in the control pressure within the pressure range assigned to the switching valve, changes to the state or the behavior of the switching valve arise. By changing the control pressure from one threshold to another threshold of the pressure range, a change in the switching position of the switching slide valve is reached. Increasing the control pressure above an upper threshold or reducing it below a lower threshold of the respectively assigned pressure range then has no further effect upon the switching position of the switching slide valve. In case of a valve unit designed as a regulating slide valve, the regulated pressure or through-flow amount changes in the event of changes within the pressure range. It is, however, also possible in cases, in which the control pressure lies outside of the assigned pressure range, for it still to have influence upon the regulated pressure or the through-flow amount. The pressure ranges can overlap but it is also possible for there to be a region between the pressure ranges which is not assigned to any of the pressure ranges. The first, second and third pressure range are thereby arranged in particular one behind the other in the direction of increasing pressure. For example a pressure range of from approximately 0 to 3 bar is assigned to the first valve unit, a pressure range of from 4 to 5 bar to the second valve unit and a pressure range of from 6 to 8 bar to the third valve unit.

Through the counter-pressure on the parking lock slide valve, an activation of the parking lock slide valve, in particular with a desired activation of the second valve unit, can be reliably avoided. Through the division of the pressure ranges, this should actually not even arise. However, due to component tolerances, wear or ageing of the hydraulic components, displacements and or overlapping of the pressure ranges and thus undesired activation of the parking lock slide valve can arise. By applying the counter-pressure to the parking lock slide valve, a secure operation of the hydraulic control can be provided for.

However, it is also possible for the third pressure range to be arranged between the first and the second pressure range. For example a pressure range of from approximately 0 to 3 bar is assigned to the first valve unit, a pressure range of from 4 to 5 bar is assigned to the parking lock slide valve and a pressure range of from 6 to 8 bar is assigned to the second valve unit.

By preventing the activation of the parking lock slide valve through the counter-pressure, the first or second valve unit can be controlled without the control having effects upon the parking lock slide valve. In the example mentioned, the second valve unit can be controlled without the parking lock slide valve being activated. The second valve unit and the parking lock slide valve can thus be controlled independently of each other by only one pre-control valve.

According to an embodiment of the invention the counter-pressure which can act on the parking lock slide valve contrary to the control pressure is taken from a pressure which mainly fulfils another function. The formulation "mainly fulfils another function" is to be understood in particular to mean that this pressure is not adapted primarily in order to take the counter-pressure therefrom. Said pressure is set for example in order to control a further valve unit or in particular to activate a switching element of the automatic transmission for example in the form of a multi-plate clutch or multi-plate brake. The pressure, from which the counter-pressure is taken, is selected in particular so that the counter-pressure is sufficiently high in the situations, in which a control of the second valve unit is meaningful or necessary, to prevent undesired activation of the parking lock slide valve.

The hydraulic control unit may comprise a switching valve, by means of which the counter-pressure can be taken from a first or a second pressure. The switching valve is configured in particular as an independently switching valve which takes the counter-pressure from the higher of the two pressures mentioned. The switching valve is thereby designed in particular as a ball switching valve. The activation of the parking lock slide valve can thereby be prevented not only in dependence upon a pressure but also in dependence upon two pressures. The control of the second valve unit without effects upon the parking lock slide valve is thus possible in very many situations.

The counter-pressure may be taken from a pressure of an activating system of a switching element of the automatic transmission. The control of the second valve unit can thus be facilitated without effects upon the parking lock slide valve when certain gears of the automatic transmission are engaged and certain switching elements are thus activated. This is advantageous particularly when the control of the second valve unit is only necessary or meaningful in certain gears.

The invention can be used particularly advantageously if the first valve unit is provided for setting a lubricating pressure and the second valve unit is assigned to a switching valve in the form of a centrifugal oil valve, by means of which an inflow to a centrifugal oil chamber of a switching element of the automatic transmission can be increased.

The first valve unit is designed in particular so that an increasing control pressure causes an increasing lubricating pressure. In the abovementioned example of the pressure ranges assigned to the valve units, this means that a high lubricating pressure is set in the control of the parking lock activating system or the centrifugal oil valve.

A parking lock of the parking lock activating system must only be controlled, in particular closed, when no gear is engaged in the automatic transmission. This does not therefore constitute a functional limitation for the parking lock activating system if no control of the parking lock is possible in some gears due to the counter-pressure. On the other hand, filling of the centrifugal oil chamber element is only necessary when certain gears are engaged in the automatic transmission. The parking lock is only activated if no gear is engaged in the automatic transmission. The centrifugal oil valve can thus be controlled in all necessary situations. The control of the parking lock activating system and the centrifugal oil valve through a common magnetic control valve does not limit the functionalities of the two systems.

The invention will become more readily apparent from the following description of exemplary embodiments thereof with reference to the accompanying drawing, in which the same elements or those having the same functions are identified by identical reference numerals.

BRIEF DESCRIPTION OF THE DRAWING

The sole FIGURE shows a hydraulic plan of a hydraulic control unit of an automatic transmission.

DESCRIPTION OF EXEMPLARY EMBODIMENTS

As shown in FIG. 1, a hydraulic control unit for an automatic transmission of a motor vehicle comprises a main operating fluid pump 10 which is driven by an internal combustion engine 11. The main pump 10 draws, via a suction filter 12, operating fluid in the form of transmission oil from a tank 13. FIG. 1 shows outlets for a tank at various points. This is to be understood in that the transmission oil passes from these outlets directly or indirectly into the tank 13. The main pump 10 conveys transmission oil into a working pressure line 14 which supplies transmission oil to a working pressure slide valve 15. In the working pressure line 14, a non-return valve 16 is arranged which permits transmission oil to flow from the main pump 10 to the working pressure slide valve 15 but not the other way around.

The working pressure slide valve 15 is a regulating slide valve of usual design, on which is operated by a pressure set by a regulating magnetic valve working pressure 17. Together with a spring force which sets a basic pressure for the working pressure, the control pressure acts against the working pressure fed back from the working pressure line 14. By changing the pressure set by the regulating magnetic valve working pressure 17, the level of the working pressure can be adjusted. If the working pressure reaches the target value set by the regulating magnetic valve working pressure 17, a connection between the working pressure line 14 and a lubricating pressure slide valve 19 is produced by the working pressure slide valve 15 via a lubricating pressure line 18. The lubricating pressure slide valve 19 is thus only supplied with transmission oil when the working pressure has reached its target value set by the regulating magnetic valve working pressure 17. The working pressure slide valve 15 thus regulates the working pressure in the working pressure line 14 to the target value set by the regulating magnetic valve working pressure 17.

The lubricating pressure slide valve 19 is also a regulating slide valve of common design, on which by way of a control pressure a pressure set by a regulating magnetic valve lubricating pressure 20 acts. The regulating magnetic valve lubricating pressure 20 can thus be described as a pre-control valve. Together with a spring force which adjusts a basic pressure as the lubricating pressure, the control pressure acts against the lubricating pressure fed back by the lubricating pressure line 18. By changing the pressure set by the regulating magnetic valve lubricating pressure 20, the level of the lubricating pressure can be adjusted. If the lubricating pressure reaches the set target value, a connection between the lubricating pressure line 18 and a return line 21 is established by the lubricating pressure slide valve 18. By means of the return line 21 transmission oil is fed back to a suction line 22 which connects the main pump 10 to the suction filter 12. The lubricating pressure slide valve 19 thus regulates the lubricating pressure in the lubricating pressure line to the target value set by the regulating magnetic valve lubricating pressure 20. The lubricating pressure slide valve 19 is thereby designed so that the maximum required lubricating pressure is achieved with a control pressure of approximately 3 bar. A pressure range of from 0 to 3 bar is thus assigned to the lubricating pressure slide valve. If the control pressure increases further, the adjusted lubricating pressure increases further.

The regulating magnetic valve 17 which provides an operating pressure and the regulating magnetic valve 20, which provides a lubricating pressure 20 are both so-called direct control valves. In direct control valves, a force of an electromagnet controlled by an electronic control means (not shown) acts directly as control force on a slide valve. A spring force and a back pressure, of which the level is to be set by the direct control valve corresponding to the control of the electronic control means, act against the control force. The pressure set by a direct control valve is taken from a supply pressure. In case of the regulating magnetic valve 17 working pressure and the regulating magnetic valve 20 lubricating pressure, the working pressure in the working pressure line 14 serves as a supply pressure.

The hydraulic control can also comprise a connection (not shown), via which a controllable torque distribution device for a four-wheel drive of the motor vehicle can be supplied with working pressure.

The hydraulic control unit has, besides the main pump 10, an additional pump 23, which can be driven by an electric motor 24 controlled by the electronic control means. The additional pump 23 can support on the one hand the main pump 10 in situations, in which the amount conveyed by the main pump 10 is not sufficient, whereby a maximum achievable pressure of the additional pump 23 is clearly lower than a maximum pressure of the main pump 10. On the other hand the additional pump 23 can ensure a basic supply of the hydraulic control unit when the internal combustion engine 11 is shut down and thus the main pump 10 is shut down. The additional pump 23 draws transmission oil, likewise via the suction filter 12, from the tank 13. It conveys transmission oil into an additional pump line 25 which is connected via a non-return valve 26 to the working pressure line 14. The non-return valve 26 is arranged in such a way that transmission oil can flow from the additional pump line 25 into the working pressure line 14 but not vice versa. The additional pump 23 can thus—in cases in which the working pressure is lower than its maximum achievable pressure—feed together with the main pump 10 into the working pressure line 14. The additional pump line 25 is also connected to an additional pump slide valve 27. By means of the additional pump slide valve 27, a connection can be established between the additional pump line 25 and the lubricating pressure line 18, wherein a non-return valve 28 is arranged between the additional pump slide valve 27 and the lubricating pressure line 18. In this way transmission oil can flow from the additional pump slide valve 27 into the lubricating pressure line 18, but not vice versa. In the illustrated basic position of the additional pump slide valve 27, the aforementioned connection between the additional pump line 25 and the lubricating pressure line 18 is interrupted. In a connected position of the additional pump slide valve 27, the aforementioned connection is established. The working pressure in the working pressure line 14 acts on the additional pump slide valve 27 as control pressure against a spring force. The spring force is designed so that the additional pump slide valve 27 remains in the basic position until the working pressure exceeds the maximum achievable pressure of the additional pump 23. If this pressure is reached, the connection between the additional pump line 25 and the lubricating pressure line 18 is established via the additional pump slide valve 27 and the additional pump 23 can convey transmission oil into the lubricating pressure line 18, in which a significantly lower pressure than the working pressure prevails. The additional oil pump 23 can thus also support the main pump 10 when the working pressure is greater than its maximum achievable pressure and it can thus no longer feed into the working pressure line 14.

By means of the working pressure line 14, regulating magnetic valves 29, 30, 31, 32, 33 and 34 are also supplied with working pressure for the activation of switching elements of the automatic transmission in the form of multi-plate clutches and brakes. The multi-plate clutches and brakes are schematically shown by gear change piston-cylinder units 35, 36, 37, 38, 39 and 40, by means of which the multi-plate clutches and brakes can be closed and opened. The gear change piston-cylinder units 35, 38 and 40 are assigned to multi-plate brakes and the gear change piston-cylinder units 36, 37 and 39 are assigned to multi-plate clutches. The regulating magnetic valves 29, 30, 31, 32, 33 and 34 are identically constructed and therefore only the regulating magnetic valve 29 will be explained in greater detail. The regulating magnetic valve 29 is also designed as a direct control valve which is controlled by the electronic control means (not shown). The regulating magnetic valve 29 is supplied with working pressure via a connection. It serves to adjust an activating pressure in a gear change pressure chamber 41 of the gear change piston-cylinder unit 35, to which it is connected via a line 42. The activating pressure in the line 42 is fed back as control pressure to the regulating magnetic valve 29. In order to avoid pressure fluctuations in the line 42, the activating pressure is additionally fed back to two further connections of the regulating magnetic valve 29. By way of a further measure to avoid pressure fluctuations, the line 42 is connected via the regulating magnetic valve 29 to a pressure storage element 43. By means of a tank return line 87, the regulating magnetic valve 29 and also the regulating magnetic valves 30, 31, 32, 33 and 34 are connected to the tank 13. In the tank return line 87, a spring-loaded non-return valve 44 is arranged. The non-return valve 44 is arranged so that transmission oil can flow into the tank 13. It is also designed so that it only opens to permit oil flow in the direction toward the tank 13 if a minimum pressure of for example 0.2 to 0.4 bar prevails in the tank return line 87. It is thus ensured that at least the aforementioned minimum pressure is always present in the tank return line 87. As a result, the line 42 and the gear change pressure chamber 41 cannot run empty but instead are always filled with transmission oil.

Through corresponding control of the regulating magnetic valve 29, an activating pressure can thus be built up and eliminated in the gear change pressure chamber of the gear change piston-cylinder unit 35 and the multi-plate brake assigned to the gear change piston-cylinder unit 35 can thus be closed and opened. Through corresponding control of the regulating magnetic valves 29, 30, 31, 32, 33 and 34, the multi-plate clutches and brakes of the automatic transmission can thus be closed and opened and the individual gears thus engaged and disengaged. The regulating magnetic valves 29, 30, 31, 32, 33 and 34 and the gear change piston-cylinder units 35, 36, 37, 38, 39 and 40 can thus be described as a gear change system 61. With the gear change system 61 shown here, a total of nine new forward gears and a reverse gear can be engaged.

The lubricant pressure line 18 is connected via a centrifugal oil valve 45 and a first supply line 63, which is configured as a controllable switching slide valve, to a converter feed 46 of a hydrodynamic torque converter 47. The pressure set by the regulating magnetic valve lubricating pressure 20 acts against a spring force as control pressure on the centrifugal oil valve 45. The spring force is designed so that the centrifugal oil valve 45, in case of exceeding a pressure threshold of for example 4 bar, changes from a basic position, as shown, into a switching position. The pressure set by the regulating magnetic lubricant pressure valve 20 thus acts both on the lubricating pressure slide valve 19 and on the centrifugal oil valve 45 as control pressure. A pressure range of from 3 to 5 bar is thus assigned to the centrifugal oil valve 45.

In the illustrated basic position of the centrifugal oil valve 45, the lubricating pressure line 18 is connected via the centrifugal oil valve 45 by means of two connections to the converter feed 46. A diaphragm 49 is arranged in a first portion 48 of the first supply line 63 between the centrifugal oil valve 45 and converter feed 46. In a second portion 50 extending parallel to the first portion 48, there is no corresponding hydraulic component. The second portion 50 is only connected in the basic position of the centrifugal oil valve 45 to the lubricating pressure line 18. The first portion 48 is on the other hand always connected to the lubricating pressure line 18. It is thus ensured that in the switching position of the centrifugal oil valve 45, in which—as described above—a very high lubricating pressure acts, the pressure at the converter feed 46 is reduced so much via the diaphragm 49 that damage to the torque converter 47 is reliably avoided.

After flowing through the torque converter 47, the transmission oil flows via a converter outflow 51 to a transmission oil cooler 52. Different lubricating points 53 in the automatic transmission are supplied with cooled transmission oil by the transmission oil cooler 52.

The torque converter 47 comprises a bridging clutch 54 which is controlled by a magnetic control valve converter 55. The magnetic control valve converter 55 adjusts an activating pressure corresponding to a control by the electronic control means in a line 56, which is connected to a pressure chamber (not shown) of the bridging clutch 54. The torque converter 47 is thus configured as a so-called 3-channel converter. The magnetic control valve converter 55 is also designed as a direct control valve and supplied with a pressurized working lubricant. In particular, a pressure corresponding to an internal pressure of the torque converter 47, which acts against the activating pressure on the bridging clutch 54, is supplied to the magnetic control valve converter 55 as a pre-control. This pressure acts in the same direction as the force of the electromagnet of the magnetic control valve converter 55 and is picked up in a line 58 which is connected via a first throttle 59 to the converter feed 46 and via a second throttle 60 to the converter outflow 51. In case of suitable choice of the throttles 59 and 60, the pressure in the line 58 corresponds to the internal pressure of the torque converter 47. The mode of operation of the recirculation and the derivation of the internal pressure are described in detail in DE 10 2004 012 117 A1.

The gear change piston-cylinder units 36, 37 and 39 of the multi-plate clutches respectively comprise a centrifugal oil chamber 62 which is connected via a centrifugal oil line 64 to the transmission cooler 52 and thus at least indirectly to the first supply line 63. The centrifugal oil chamber 62 is arranged opposite the gear change pressure chamber 41 with regard to a gear change piston 65 which acts on the multi-plate clutches. Insofar as the centrifugal oil chamber 62 is sufficiently filled with transmission oil, the pressure increases in the gear change pressure chamber 41 and in the centrifugal oil chamber 62 as a result of the rotation of the gear change piston-cylinder units 36, 37 and 39 are balanced out.

In some situations, for example in case of certain connections in the automatic transmission, a functioning centrifugal oil pressure compensation, thus adequately filled centrifugal oil chambers 62, is important. In these situations, by means of a corresponding pressure of the regulating lubricating pressure magnetic valve 20, the centrifugal oil valve 45 can be brought, as described above, into its switching position. In this switching position, by means of the centrifugal oil valve 45, a connection is established between the lubricating oil line 18 and a second supply line 66, which extends to the centrifugal oil line 64. Transmission oil is thus fed to the centrifugal oil line 64 not only via the first supply line 63 but also via the second supply line 66. The centrifugal oil chambers 62 of the gear change piston-cylinder units 36, 37 and 39 can thus be very quickly filled and a functioning centrifugal oil compensation thus achieved.

In the second supply line 66, a throttle 67 is arranged. By means of this throttle 67 and the throttle 49 in the first portion 48 of the first supply line 63, through-flow amounts of the transmission oil into the first and second supply line 63, 66 can be set. A non-return valve can be arranged in the centrifugal oil line 64 in such a way that a back-flow of transmission oil from the second supply line 66 toward the transmission cooler 52 can be prevented.

The hydraulic control unit also comprises a parking lock activating system 68, by means of which a parking lock (not shown) can be engaged and disengaged. The parking lock activating system 68 has a parking lock piston-cylinder unit 69 with a parking lock piston 70 which is connected at least indirectly to a so-called parking lock pawl (not shown). By displacing the parking lock piston 70 in a first activating direction 71, the parking lock is disengaged and, in case of a displacement in a second activating direction 72 contrary to the first activating direction 71, it is engaged. If the parking lock is engaged, this position is described below as P position. If the parking lock is not engaged this position is described as non-P position. The parking lock piston-cylinder unit 69 comprises a first parking lock pressure chamber 73. By supplying transmission oil into the first parking lock pressure chamber 73, the parking lock piston 70 can be displaced in the non-P direction (first activating direction 71). The parking lock piston-cylinder unit 69 comprises, on a side opposing the first parking lock pressure chamber 73 in relation to the parking lock piston 70, a second parking lock pressure chamber 74. By supplying transmission oil into the second parking lock pressure chamber 74, the parking lock piston 70 can be displaced in the P direction (second activating direction 72).

The parking lock piston-cylinder unit 69 also comprises a parking lock spring 75 which is arranged so that it applies a spring force in the P direction to the parking lock piston 70.

The parking lock piston-cylinder unit 69 also comprises a controllable engagement means 76, by means of which a position of the parking lock piston 70 can be fixed. The engagement means 76 also has a lifting magnet 77 controlled by the electronic control means, whereby said lifting magnet 77 can engage in a contour 78 of a piston rod 79 connected to the parking lock piston 70. The engagement means 76 is designed so that it can be over-pressured in P direction. Said contour 78 is designed so that it can press back the lifting magnet 77 in case of a displacement of the parking lock piston 70 in P direction. Over-pressuring of the engagement means 76 in the non-P direction is on the other hand not possible.

By means of a parking lock slide valve 80 supplied with working pressure, transmission oil can be supplied into the second parking lock pressure chamber 74 and an activating force can be applied in P direction in addition to the force of the parking lock spring 75. The parking lock slide valve 80 is designed as a switching slide valve with two positions. In a P position (not shown), the working pressure line 14 is connected via the parking lock slide valve 80 to the second parking lock pressure chamber 74 so that transmission oil is supplied to it.

In case of a displacement of the parking lock piston 70 in P direction, transmission oil must be removed from the first parking lock pressure chamber 73. In order to ensure that this is possible quickly and with only limited resistance, the parking lock activating system 68 comprises a discharge slide valve 81 formed as a switching slide valve with two positions with large through-flow cross-sections, said discharge slide valve 81 being connected to the first parking lock pressure chamber 73. In an illustrated discharge position, the first parking lock pressure chamber 73 is connected to the tank 13 via the discharge slide valve 81. The transmission oil must thus be removed from the first parking lock pressure chamber 73 not via the parking lock slide valve 80 with significantly smaller through-flow cross-sections into the tank 13 but can instead flow into the tank 13 via the discharge slide valve 81 without great resistance. In a fill position (not shown) of the discharge slide valve 81, a parking lock connecting line 82, which connects a connection of the parking lock slide valve 80 to the discharge slide valve 81, is connected via the discharge slide valve 81 to the first parking lock pressure chamber 73. Transmission oil can thus be supplied to the first parking lock pressure chamber 73 in the fill position of the discharge slide valve 81 and the parking lock piston 70 thus moved in non-P direction. The pressure in the parking lock connecting line 82, which acts against a spring pressure of a discharge spring 83, thus acts as control pressure for the switchover between the fill and discharge position of the discharge slide valve 81. The discharge slide valve 81 is designed so that it can be brought through the spring force of the discharge spring 83 into the discharge position, thus representing its basic position.

By means of the parking lock slide valve 80, the parking lock connecting line 82 can be connected to the working pressure line 14. The parking lock slide valve 80 is then in a non-P position, as shown. The discharge slide valve 81 is thereby initially still in the discharge position, in which it closes the parking lock connecting line 82 so far that a pressure can build up in the parking lock connecting line 82. The working pressure, which then also acts as control pressure on the discharge slide valve 81 and brings it into the fill position against the spring force, then acts in the parking lock connecting line 82. In case of a sufficiently high working pressure, therefore, transmission oil is supplied to the first parking lock pressure chamber 73 and the parking lock is disengaged insofar as the engagement means is deactivated, the lifting magnet not therefore engaging in the contour 74. For this, transmission oil must be able to flow from the second parking lock pressure chamber 74 into the tank 13, which is why in the non-P position of the parking lock slide valve 80 the second parking lock pressure chamber 74 is connected to the tank 13 via the parking lock slide valve 80.

The pressure set by the lubricating pressure regulating magnetic valve 20 acts as control pressure on the parking lock slide valve 80 against a spring force of a parking lock slide valve spring 84. This pressure thus acts as control pressure on the lubricating pressure slide valve 19 as a first valve unit, on the centrifugal oil valve 45 as a second valve unit and the parking lock slide valve 80 as a third valve unit. The parking lock slide valve spring 84 is arranged so that it can bring the parking lock slide valve 80 into the non-P position, thus representing the basic position of the parking lock slide valve 80. The parking lock slide valve 80 is designed so that—if no further pressures are acting on it—it adopts the P position with effect from a control pressure of approximately 7 bar. As the regulating magnetic valve lubricating pressure 20 can be maximum 8 bar, a pressure range of from 6 to 8 bar is assigned to the parking lock slide valve 80.

The parking lock slide valve 80 is also connected to a counter-pressure line 85 in such a way that a pressure in the counter-pressure line 85 can act in the same direction with the spring force of the parking lock slide valve spring 84 as counter-pressure against the control pressure. In case of correspondingly high counter-pressure, the parking lock slide valve 80 thus also remains in the non-P position when a control pressure is set, at which the centrifugal oil valve 45 is in its switching position, in which a rapid filling of the centrifugal oil element 62 is possible. This is also guaranteed when, due to tolerances, wear or ageing, the aforementioned pressure ranges have displaced and overlap each other. The counter-pressure line 85 is connected via a ball switching valve 86 to the gear change pressure chambers 41 of the gear change piston-cylinder units 37 and 39. The ball switching valve 86 is thereby arranged so that the higher of the two in said pressure chambers 41 acts as counter-pressure on the parking lock slide valve 80. If one of the two multi-plate clutches assigned to the gear change piston-cylinder units 37 and 39 is activated and thus closed, the counter-pressure is sufficiently great to prevent the switching of the parking lock slide valve 80 into the P position. The hydraulic control is thus designed so that one of the two clutches is closed in all gears, in which a control of the centrifugal oil valve 45 may be necessary.

If the parking lock is only to be engaged in case of very low or no working pressure, thus for example if the internal combustion engine 11 is stationary and thus the main pump 10 is stationary, the parking lock spring 75 is used for this purpose. In this connection the lifting magnet 77 and thus the engagement means 76 are deactivated and the parking lock spring 75 can displace the parking lock piston 70 in the direction of the P position. Transmission oil must thereby be removed from the first parking lock pressure chamber 73. As no or only a very low working pressure is available, the parking lock slide valve 80 is in its basic position. It cannot therefore be brought into the P position, but is instead in the non-P position. In the non-P' position of the parking lock slide valve 80, there is no connection between the parking lock connecting line 82 and the tank 13 via the parking lock slide valve 80 apart from via slide valve gaps. By means of the parking lock slide valve 80, the transmission oil could therefore flow away only very slowly in the direction of the tank 13. Since there is no pressure or only a low pressure in the parking lock connecting line 82 in this case, the discharge slide valve 81 is—as described above—in its discharge position. The transmission oil can thus be removed very quickly from the first parking lock pressure chamber 73 via the discharge slide valve 81 to the tank 13 and the parking lock thus engaged.

What is claimed is:

1. A hydraulic control arrangement for an automatic transmission of a motor vehicle with a parking lock activating system (68) which has a parking lock slide valve (80) and a parking lock piston-cylinder unit (69) with a parking lock piston (70) and a first parking lock pressure chamber (73), whereby, by supplying operating fluid via the parking lock slide valve (80) into the first parking lock pressure chamber (73), the parking lock piston (70) can be displaced in a first activating direction (71) and in case of a displacement of the parking lock piston (70) in a second activating direction (72) contrary to the first activating direction (71), operating fluid is removed from the first parking lock pressure chamber (73), the parking lock activating system (68) comprising a discharge slide valve (81), by way of which the first parking lock pressure chamber (73) can be connected to a tank (13), the discharge slide valve (81) being arranged between the parking lock slide valve (80) and the parking lock piston-cylinder unit (69) and having at least two positions, a fill position, in which a parking lock connecting line (82) extending between the parking lock slide valve (80) and the discharge slide valve (81) is connected via the discharge slide valve (81) to the first parking lock pressure chamber (73), and a discharge position in which the first pressure chamber (73) is connected via the discharge slide valve (81) to the tank (13) and the parking lock connecting line (82) is closed by the discharge slide valve (81), wherein as control pressure for a switchover between the two positions of the discharge slide valve (81), pressure present in said parking locking connecting line (82) between the parking lock slide valve (80) and the discharge slide valve (81) is supplied to the discharge slide valve (81).

2. The hydraulic control arrangement according to claim 1, wherein the parking lock slide valve (80) is designed in such a way that, in a basic position thereof, there is no connection between the parking lock connecting line (82) and the tank (13) via which operating fluid can be conveyed from the parking lock slide valve (80) to the first parking lock pressure chamber (73) and the tank (13).

3. The hydraulic control arrangement according to claim 1, wherein the discharge slide valve (81) has only the fill position and the discharge position and the control pressure acts against a discharge spring (83), wherein the discharge slide valve (71) is biased toward the discharge position by the discharge spring (83).

4. The hydraulic control arrangement according to claim 1, wherein the parking lock piston-cylinder unit (69) comprises a parking lock spring (75) which is arranged so that it applies a force to the parking lock piston (70) in the second activating direction (72).

5. The hydraulic control arrangement according to claim 1, wherein the parking lock piston-cylinder unit (69) comprises a second parking lock pressure chamber (74), into which operating fluid can be supplied via the parking lock slide valve (80) for displacement of the parking lock piston (70) in the second activating direction (72).

6. The hydraulic control arrangement according to claim 1, wherein the parking lock piston-cylinder unit (69) comprises a controllable engagement means (76), by means of which a position of the parking lock piston (70) can be fixed.

7. The hydraulic control arrangement according to claim 1, including a pre-control valve (20) and a first and a second valve unit (19, 45), wherein a pre-control pressure set by means of the pre-control valve (20) can be conveyed as control pressure to the first and second valve unit (19, 45) and to the parking lock slide valve (80) forming a third valve unit, and a counter-pressure acting against the control pressure can be supplied to the parking lock slide valve (80) by way of a counter-pressure line (85) for preventing activation of the parking lock slide valve (80).

8. The hydraulic control arrangement according to claim 7, wherein said counter-pressure is taken from a pressure source which mainly fulfils another function.

9. The hydraulic control arrangement according to claim 8, wherein a switching valve (86) is provided, by means of which the counter-pressure can be taken from a first or a second pressure source.

10. The hydraulic control arrangement according to claim 8, wherein the counter-pressure is taken from an activating pressure source of a switching element (37, 39) of the automatic transmission.

* * * * *